United States Patent
Jones

(10) Patent No.: US 10,685,491 B2
(45) Date of Patent: Jun. 16, 2020

(54) SYSTEMS AND METHODS FOR VIRTUAL REALITY AND AUGMENTED REALITY PATH MANAGEMENT

(71) Applicant: Universal City Studios LLC, Universal City, CA (US)

(72) Inventor: Matthew Preston Jones, Honolulu, HI (US)

(73) Assignee: Universal City Studios LLC, Universal City, CA (US)

( * ) Notice: Subject to any disclaimer, the term of this patent is extended or adjusted under 35 U.S.C. 154(b) by 227 days.

(21) Appl. No.: 15/653,214

(22) Filed: Jul. 18, 2017

(65) Prior Publication Data
US 2019/0026946 A1    Jan. 24, 2019

(51) Int. Cl.
| | | |
|---|---|---|
| A63G 31/16 | (2006.01) | |
| G06T 19/00 | (2011.01) | |
| A63G 21/20 | (2006.01) | |
| G02B 27/01 | (2006.01) | |
| A63G 31/00 | (2006.01) | |

(52) U.S. Cl.
CPC ............ *G06T 19/006* (2013.01); *A63G 21/20* (2013.01); *A63G 31/16* (2013.01); *G02B 27/017* (2013.01); *G06T 19/003* (2013.01); *A63G 31/00* (2013.01); *G06T 19/00* (2013.01)

(58) Field of Classification Search
CPC ..... G06T 19/00; G06T 19/003; G06T 19/006; G06T 19/20; G06T 1/00; G06T 1/0014; B61B 3/00; B61B 3/02; B61B 13/00; B61B 25/00; B61B 25/08; B61B 25/22; B61B 25/24

See application file for complete search history.

(56) References Cited

U.S. PATENT DOCUMENTS

| | | | |
|---|---|---|---|
| 6,007,338 A | 12/1999 | DiNunzio et al. | |
| 6,227,121 B1 | 5/2001 | Mares | |
| 9,669,321 B2 | 6/2017 | Reveley | |
| 2007/0089630 A1* | 4/2007 | Gordon | A63G 7/00 104/53 |
| 2016/0346704 A1* | 12/2016 | Wagner | A63G 7/00 |
| 2018/0304162 A1* | 10/2018 | Freedman | A63G 31/08 |

FOREIGN PATENT DOCUMENTS

GB    2542434    *    3/2017    ............. A63G 31/16

OTHER PUBLICATIONS

PCT/US2018/041489 Invitation to Pay Additional Fees dated Oct. 12, 2018.

* cited by examiner

*Primary Examiner* — Robert J McCarry, Jr.
(74) *Attorney, Agent, or Firm* — Fletcher Yoder, P.C.

(57) ABSTRACT

In accordance with one embodiment, a ride attraction system includes a track, a bogie coupled to the track and configured to move along the track, and an attachment coupled to the bogie and configured to couple a user to the bogie. The ride attraction system also includes an image controller coupled to the bogie and configured to supply virtual reality (VR) and/or mixed reality (MR) images to the user via headgear.

21 Claims, 5 Drawing Sheets

SYSTEMS AND METHODS FOR VIRTUAL REALITY AND AUGMENTED REALITY PATH MANAGEMENT

FIELD OF DISCLOSURE

The present disclosure relates generally to the field of amusement parks. More specifically, embodiments of the present disclosure relate to methods and equipment used in conjunction with amusement park games or rides.

BACKGROUND

Since the early twentieth century, amusement parks (or theme parks) have substantially grown in popularity. One type of amusement park attraction may consist of a dark ride in which multiple patrons are secured into individual cars as they travel at a predetermined speed along a predetermined path within a ride environment that includes preset effects to enhance a ride narrative. For example, projected images, smoke effects, and/or motion effects may be used to create a sense of immersion in the ride. In parallel, the use of virtual reality (VR) and augmented reality (AR) entertainment systems, e.g., for consumer entertainment, has been on the rise. Certain types of attractions may incorporate VR/AR headsets that are worn by patrons to facilitate a sense of immersion in an alternate universe in a manner that enhances the ride narrative.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with one embodiment, a ride attraction system includes a track, a bogie coupled to the track and configured to move along the track, and an attachment coupled to the bogie and configured to couple a user to the bogie. The ride attraction system also includes an image controller coupled to the bogie and configured to supply virtual reality (VR) and/or mixed reality (MR) images to the user via headgear.

In another embodiment, a ride attraction system includes a track and a plurality of bogies coupled to the track and configured to move along the track under artificial and/or user power. Each of the plurality of bogies is configured to be coupled to a respective user. The ride attraction system also includes a controller configured to receive location information related to a location of each of the plurality of bogies along the track and provide first instructions to the at least one locking mechanism coupled to an individual bogie of the plurality of bogies to cause the at least one locking mechanism to activate based on the location information. The instructions activate the locking mechanism to prevent advancement of the individual bogie along the track. The controller is also configured to receive updated location information related to a second location of each of the plurality of bogies along the track and provide second instructions to the at least one locking mechanism coupled to the individual bogie to cause the locking mechanism to release the individual bogie based on the updated location information.

In another embodiment, a ride attraction system includes a track, a bogie coupled to the track and configured to move along the track under artificial power and/or user power, and an attraction controller. The attraction controller is configured to receive location information related to a block zone location of the bogie, provide instructions to at least one locking mechanism coupled to the bogie to cause the at least one locking mechanism to activate based on the location information to cause the bogie to remain in the block zone location, receive input related to one or more actions of the user in the block zone location, and provide instructions to one or both of a track switch controller or a special effects controller based on the input.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
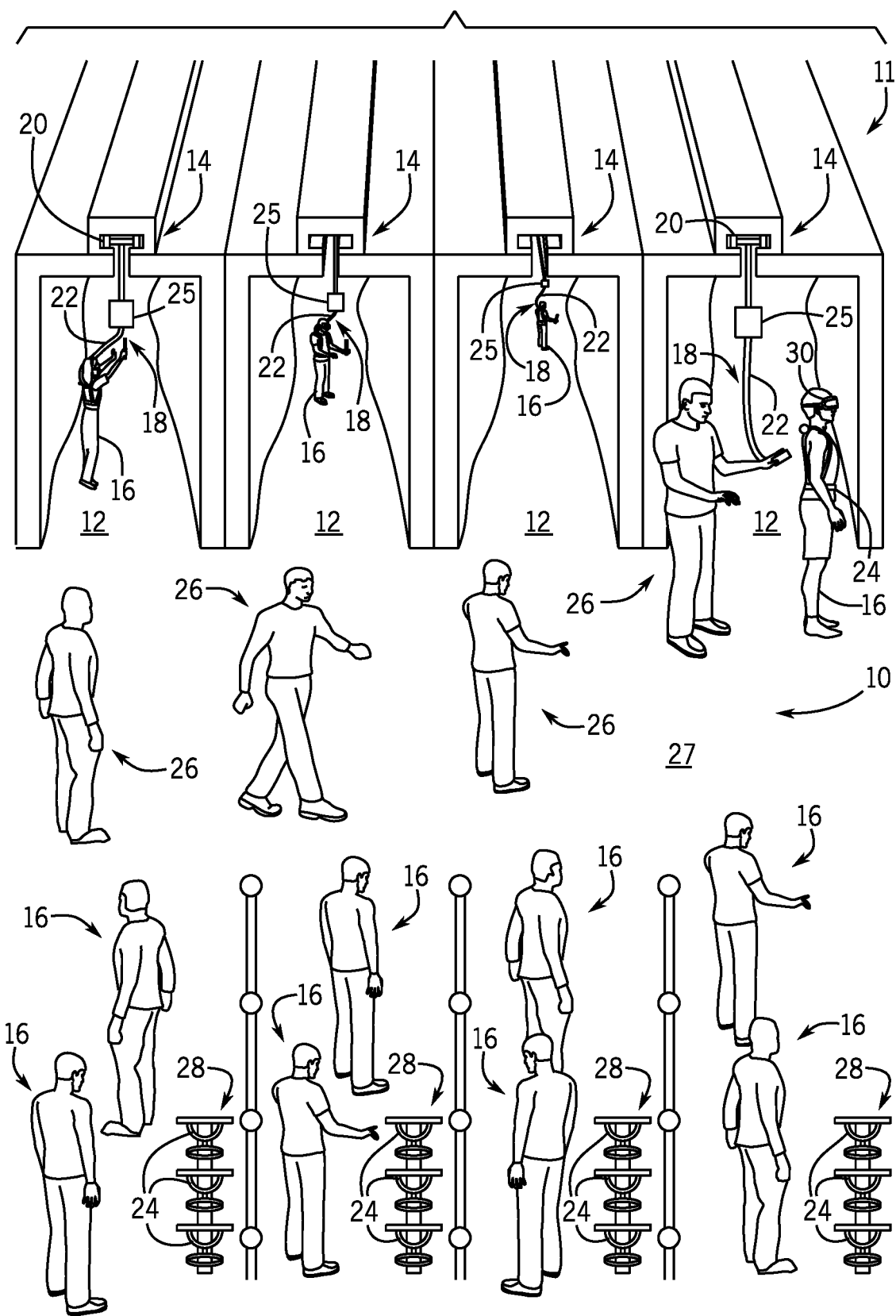
FIG. 1 is a perspective view of an embodiment of an attraction that may utilize a virtual reality (VR) track system in accordance with the present techniques.

While virtual reality (VR) and/or augmented reality (AR) systems aim to provide immersive entertainment, certain challenges exist that prevent users from being completely immersed in their experiences. A typical VR user wears a headset that replaces images of the actual environment with the virtual environment. Because the user cannot see the actual environment, the user cannot determine where boundaries, obstacles, or other users are within the environment to avoid inadvertent contact. To prevent such inadvertent contact, an attraction may restrict the movement of the user by providing a vehicle in which the user is secured and that travels at a predetermined speed along a path. However, by restricting movement in such a manner, users are prevented from having a truly immersive experience. Another type of entertainment system may use a treadmill or sliding-type walking surface to provide the illusion of free movement while holding the user in one place. However, such systems do not feel like a natural walking movement to certain users. Other types of entertainment systems provide warnings to users when boundaries are reached beyond which the VR experience is unsupported. However, the warnings serve to pull the user out of the experience.

Provided herein are techniques that may be used within a VR game, experience, or attraction to permit a user to move outside of a confined vehicle while maintaining appropriate distances from other users and boundaries. It should be understood that, while certain embodiments are disclosed in the context of VR, the disclosed embodiments may alternatively or additionally be used in conjunction with VR, AR, mixed reality (MR), 360 degree view, or any combination thereof. Further, while certain embodiments may be disclosed in the context of amusement or theme parks, the bogie systems may be used in other contexts, e.g., for entertainment venues, home entertainment use, etc.

In some embodiments, in a VR attraction, a user may be coupled to an overhead track via an attachment system that, for example, may include a bogie, an attachment, and a harness. The bogie may be coupled to and move along the track. The attachment may extend downwardly from the bogie and couple to the harness, which in turn is worn by the user. As the user walks through the attraction, the motive power supplied by the user triggers movement of the bogie along the track. The attachment system may allow the user to move in a generally natural walking motion such that the user may move freely within a given VR environment. While the harness and attachment coupled to the bogie may provide movement limits as provided herein (e.g., block zones, a radius about which the user may move while in the harness and defined by the configuration of the attachment of the bogie to the track), the ability of the user to walk through the VR attraction contributes to the overall immersion. The attachment system may also support the weight of the user to enhance certain effects or to help maintain the balance of the user. To facilitate the creation of the VR environment, a controller may be disposed on the attachment between the user and the bogie. The controller may communicate VR images to headgear (e.g., glasses, helmet, visor, etc.) worn by the user. The controller may also communicate with attraction systems that may further immerse the user in the VR environment. For example, the attraction may control various feedback mechanisms (e.g., haptic feedback), special effects systems, and the like that may further enhance the experience of the user.

In some embodiments, multiple users may be dispersed on respective multiple tracks at the same time within the VR attraction. To ensure that users do not interfere with other users' experiences in the VR attraction, a block zone controller as provided herein may control a number of users in a particular block zone. In some embodiments, the block zone may be defined with sections along the track, and/or a distance along the track relative to a location of a user. For example, if a first user is on the boundary of another block zone that is already occupied by a second user, the bogie to which the first user is coupled to may employ a locking or braking mechanism to prevent the first user from entering the block zone that is already occupied by the second user.

To prevent a user from being pulled out of the VR experience while being prevented from entering an occupied block zone, the boundary of occupied block zones may correspond to boundaries within the VR environment. For example, the edge of an occupied block zone may correspond to a gate, wall, dense foliage, dense fog, etc. that may appear impassible to the user while immersed in the VR environment. In some embodiments, the user may also be presented with an option that may appear as a door, tunnel, crawl space, etc. within the VR environment. The option may correspond to a real-life track switch such that if the user chooses to travel through the option, the user may travel to an adjacent track and the corresponding bogie to which the user is coupled to may utilize the track switch to switch to the adjacent track.

Further, as mentioned above, aspects of the VR attraction may be processed by one or more controllers. For example, an attraction controller may communicate with an attachment controller on each of the attachment systems. The controller may process information related to images displayed to the user via the headgear, special effects of the environment/attachment system, and overall control of the environment/attachment system.

The disclosed VR attraction system may be implemented with amusement park attractions including shows, rides, games, promotions, etc. By employing the VR attraction system in conjunction with particular themes, such as traditional video games, guests are incentivized to visit the amusement park and are further enabled to enjoy the thematic experience provided by the amusement park. Further, because the VR attraction system is flexible, one game arena may be configured to host games having a variety of different themes.

With the foregoing in mind, FIG. 1 illustrates an embodiment of an attraction 10 (e.g., a VR attraction/game, a ride attraction system) in accordance with the present disclosure. The attraction 10 may include a VR track system 11 having one or more paths 12 which further include respective tracks 14. Each user 16 may be coupled to a track 14 in the VR track system 11 via an attachment system 18. As discussed in further detail below, the attachment system 18 may include a bogie 20, an attachment 22 (e.g., tether, connection, connector), and a harness 24. The harness 24 may allow the user 16 to have at least partial or full movement of all appendages and to walk naturally along the path 12 (e.g., by walking on a floor or surface of the attraction). The bogie 20 may be coupled to the track 14 and the attachment 22 may couple the harness 24 to the bogie 20. The bogie 20 and the attachment system 18 may support the weight of the user 16. Particularly, if the user 16 trips, loses balance, falls, etc., the attachment system 18 may support the weight of the user 16. An image controller 25 may be coupled to the attachment system 18 such that the image controller 25 travels with the user 16 as the user 16 travels along the path 12. In some embodiments, the image controller 25 may be coupled to the attachment system 18 between the user 16 and the bogie 20. In some embodiments, the image controller 25 may be coupled to the attachment system 18 above the track 14 as will be discussed further in FIG. 5. As discussed below in FIGS. 3 and 4, the attachment 22 may include a tether and/or an articulating arm. Further, the harness 24 may be a five point harness, a climbing harness, and/or a traditional rollercoaster ride restraint.

As mentioned above, at least partially to help aid in throughput of users through the attraction 10, the attraction 10 may include multiple paths 12. Similarly, the attraction 10 may also include multiple ride administrators 26 to assist users in starting down the path 12 and coupling to the attachment system 18. For example, in some embodiments, the ride administrator 26 may help fit the harness 24 to the user 16 and couple the attachment 22 to the harness 24. In some embodiments, the user 16 may don the harness 24 while waiting to be coupled to the attachment system 18 and start along the path 12. For example, in some embodiments, there may be one or more harness stands 28 that may provide the users 16 with the harnesses 24 so that the users 16 may approach the path 12 already wearing the harness 24 in the interest of throughput efficiency. In some embodiments, the ride administrator 26 may also supply the user with headgear 30 (e.g., VR/AR head gear). In some embodiments, there may be a stand similar to the one or more harness stands 28 that may supply the users 16 with the headgear 30. In some embodiments, the headgear 30 may be coupled to the attachment system 18.

Once the user 16 has been coupled to the track 14 via the attachment system 18, the user 16 may walk along the path 12, thereby also moving the bogie 20 along the track 14. As depicted in the current embodiment, the users 16 may wait adjacent to a starting point 27 of the paths 12. In some embodiments, an end point of the paths 12 may be located at a location different than the starting point 27 (e.g., elsewhere in a theme park). In some embodiments, each path 12 may have an end point at different locations throughout a theme park. In some embodiments, the starting point 27 and the end point of the paths 12 of the attraction 10 may be in the same location. Further, although each path 12 is depicted as adjacent to one another and parallel, in some embodiments, each path 12 may be positioned a distance from one another and have various orientations and arrangements.

Figure 2:
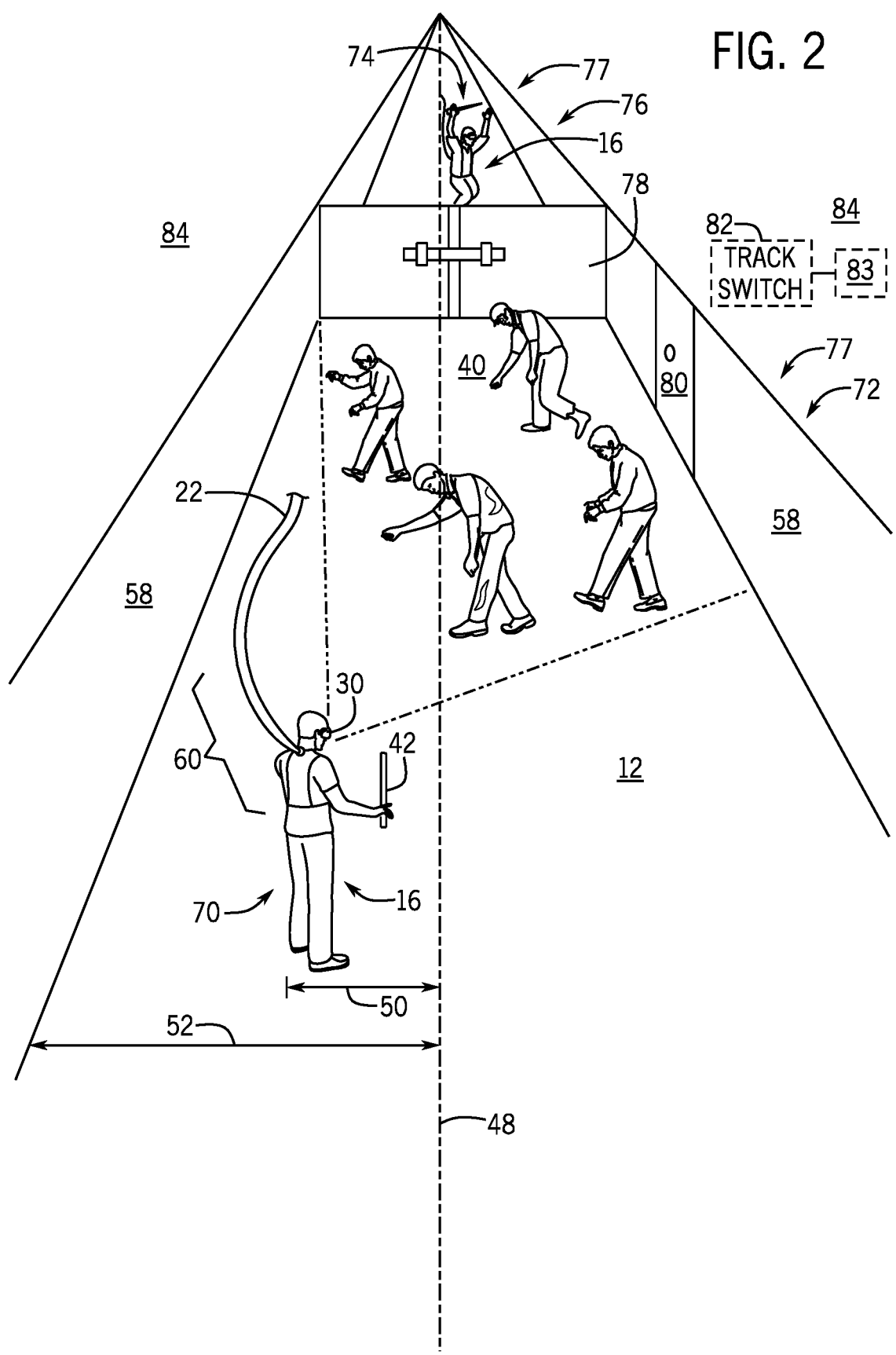
FIG. 2 is a perspective view of an embodiment of a user within the attraction of FIG. 1 in accordance with the present techniques.

FIG. 2 is a perspective view of the user 16 immersed within a VR scenario 40 of the attraction 10 as the user 16 travels along the path 12. As mentioned above, the headgear 30 may replace images of the path 12 with VR images of the VR scenario 40 in accordance with a narrative of the path 12. For example, as depicted, a narrative of the path 12 may include zombies that the user may engage in combat. However, it is to be understood that the VR scenario 40 may be communicated to the user as a variety of narratives. For example, aside from zombies, the narrative of the VR scenario 40 may include butterfly catching, pirates, dinosaurs, dragons, etc. Further, the users 16 may also utilize one or more totems 42 (e.g., input devices) that may enable the user 16 to be further immersed within the VR scenario 40. In one embodiment, the one or more totems 42 are handheld devices. The one or more totems 42 may serve as input devices that may interact with elements of the path 12 and/or VR scenario 40. For example, the one or more totems 42 may appear as one or more weapons, tools, items, etc. to the user 16 in accordance with the narrative of the VR scenario 40.

While the user 16 travels along the path 12, the user 16 may generally be permitted to travel about the coupling point of the attachment system 18 with the track 14. For example, the attachment system 18 may allow the user 16 to travel a lateral distance 50 away from a path center 48, which may be disposed directly below and parallel to the track 14 (not shown). In some embodiments, the lateral distance 50 to which the user 16 is limited may be expressed relative to a total distance 52. The total distance 52 may be defined by the distance between a boundary 58 of the path 12 and the path center 48. In some embodiments, the lateral distance 50 may be approximately ninety percent, eighty percent, seventy-five percent, sixty percent, fifty percent, forty percent, or between sixty and ninety percent of the total distance 52. In some embodiments, the lateral distance 50 to which the user 16 is limited may be approximately an arm's length (e.g., between two and four feet) less than the total distance 52. In this manner, the attachment system 18 may prevent the user 16 from inadvertently coming into contact with the boundary 58. In some embodiments, the lateral distance 50 to which the user 16 is limited may vary as the user 16 travels along the path 12. This may provide for the user 16 to be further immersed within the VR scenario 40. For example, limiting the lateral distance 50 may encourage the user 16 to think they are traveling along a narrow ledge, within a crevice, along a narrow path, etc. In some embodiments, the lateral distance 50 may be enforced by the length of the attachment 22, which may have a corresponding variable length and/or radius relative to the location of the bogie 20. For example, the attachment system 18 may include a mechanical arm or tether that may extend and retract to limit the user 16 to the varied lateral distance 50. Further, it should be noted that in some embodiments, the boundary 58 may be a physical structure (e.g., a wall, a rope, etc.) and in some embodiments, the boundary 58 may be an imaginary boundary defined by the total distance 52 relative to the path center 48.

Further, the attachment 22 of the attachment system 18 may be configured such that the attachment 22 does not inadvertently contact the user 16 (aside from the contact of the coupling between the attachment 22 and the user 16) regardless of the location and orientation of the user 16 within the path 12. For example, if the user 16 travels a distance (e.g., lateral distance 50) away from the path center 48 and is facing away from the path center 48, the attachment 22 may extend from behind the user 16 directly to the bogie 20 disposed within the track 14. However, if the user 16 travels the distance (e.g., lateral distance 50) away from the path center 48 and is facing generally towards the path center 48 as depicted in FIG. 2, the attachment 22 may first extend behind the user 16 away from the path center 48 before extending towards the bogie 20 in the track 14, which are disposed above the path center 48. To this end, the attachment 22 may include a rigid portion 60 that is generally curved in shape so as to extend around and above the user 16 before extending toward the track 14. In some embodiments, as discussed below with respect to FIG. 4, the attachment 22 may include several rigid portions (e.g., arm segments) coupled together via rotational joints.

Figure 4:
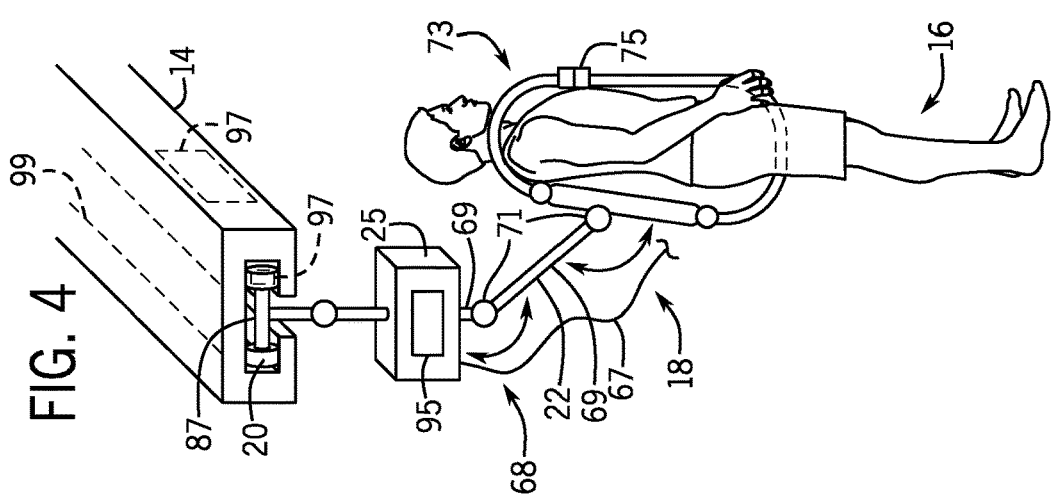
FIG. 4 is a perspective view of an embodiment of an attachment system coupled to a track of the attraction of FIG. 1 in accordance with the present techniques.
Figure 3:
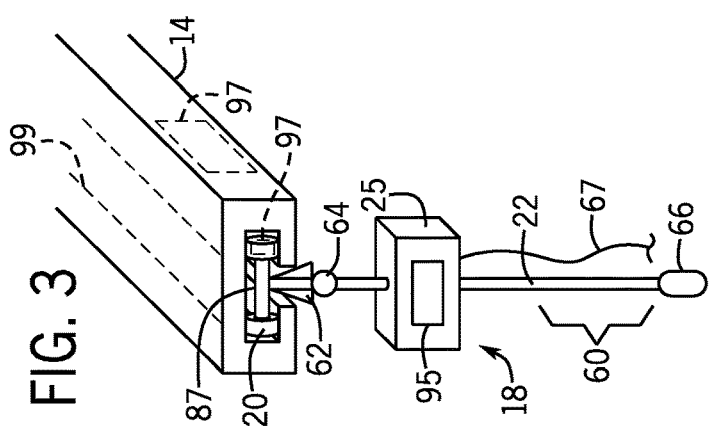
FIG. 3 is a perspective view of an embodiment of an attachment system coupled to a track of the attraction of FIG. 1 in accordance with the present techniques.

FIGS. 3 and 4 depict embodiments of the attachment system 18 coupled to the track 14. As shown in FIG. 3 and mentioned above, the attachment system 18 may include the bogie 20, the attachment 22, and the image controller 25. The attachment system 18 may further include a shock absorber 62, a reel 64, and a clip 66. The shock absorber 62 may absorb at least some force of the user 16 if the user 16 loses balance. The shock absorber 62 may be any suitable shock absorption device such as a pneumatic shock absorber and/or a spring-function shock absorber. Further, the length of the attachment 22 may be adjustable via the reel 64. Particularly, in some embodiments, the reel 64 may store lengths of the attachment 22 depending at least on a height of the user 16. Further still, the clip 66 may couple to the back of the user 16 via the harness 24 as mentioned above. The clip 66 may be any suitable attachment device such as a carabiner or a mechanical link. Also, as mentioned above, the attachment 22 may include the rigid portion 60 disposed adjacent to the clip 66. As depicted in FIG. 2, the rigid portion 60 may be generally curvilinear in shape as mentioned above. Other portions of the attachment 22 may be flexible having physical properties similar to that of a rope, tether, wire, etc. In some embodiments, the image controller 25 may communicate with the headgear 30 as described in further detail below. To this end, the attachment system 18 may include a wire 67 that may transmit data (e.g., information) between the image controller 25 and the headgear 30. In some embodiments, the image controller 25 may communicate wirelessly with the headgear 30.

Further, as shown in FIG. 4, the attachment system 18 may include an arm 68 having one or more rigid arm segments 69. The one or more rigid arm segments 69 may be connected via one or more joints 71. The one or more joints 71 may rotate in any direction about all directional axes. The arm 68 may function as a shock absorber and/or support in a case of the user 16 losing balance while immersed in the VR scenario 40. Further, the attachment system 18 in the depicted embodiment may further include a restraint 73. In some embodiments, the user utilizes the restraint 73 instead of the harness 24 to couple to the attachment system 18. Similar to the harness 24, the restraint 73 may allow the user 16 to have full appendage (e.g., arms, legs, head) movement while keeping the user 16 secured to the attachment system 18. To don the restraint 73, the user 16 may utilize one or more buckles 75 which may clip together in front of the user 16. In some embodiments, the one or more buckles 75 may be un-clipped at the end of a ride cycle. In this embodiment, the attachment system 18 may also utilize the wire 67 which may function as described above with respect to FIG. 3. In some embodiments, the arm 68 may be actuated (e.g., hydraulically actuated) based on the VR scenario 40. For example, the arm 68 may lift the user 16, which may induce a feeling of weightlessness in the user 16 in a falling or space-themed VR scenario 40.

Referring now back to FIG. 2, as mentioned above, the attraction 10 may utilize block zones 77 to prevent the users 16 from approaching one another. Particularly, in some embodiments, sections of the track 14 (e.g., path 12) may be divided into separate block zones 77 which may be considered occupied or unoccupied. For example, in the depicted embodiment, a first user 70 may be disposed within a first block zone 72 and a second user 74 may be disposed within a second block zone 76. Because the second block zone 76 is occupied by the second user 74, the first user 70 may be prevented from entering the second block zone 76. Similarly, the second user 74 may be prevented from entering the first block zone 72 because it is occupied by the first user 70. However, if one of the users (e.g., first user 70 and/or second user 74) vacates their respective block zones (e.g., first block zone 72 and/or second block zone 76), the other user (e.g., first user 70 and/or second user 74) may then be permitted to enter the other block zone (e.g., first block zone 72 and/or second block zone 76). In some embodiments, if the block zone 77 adjacent to the first user 70 and/or the second user 74 is occupied, the first user 70 and/or the second user 74 may be limited by what may appear to them as a VR impassible obstacle 78 in the context of the narrative of the attraction 10 and/or path 12. For example, the VR impassible obstacle 78 may appear as VR images of a locked gate, a dense fog, dense foliage, a wall, etc. to the user 16 through the headgear 30. Accordingly, if the adjacent block zone 77 becomes vacant, the VR impassible obstacle 78 may no longer be presented to the user 16 through the headgear 30.

In some embodiments, block zones 77 may be associated with individual users 16 rather than, or in addition to, being associated with sections of the track 14 and/or path 12 as described above. For example, in some embodiments, the block zone 77 may be defined by a distance along the path 12 and/or track 14 (e.g., path center 48) from the location of the user 16. Accordingly, in some embodiments, the VR impassible obstacles 78 which may be associated with a boundary of an adjacent occupied block zone 77 may move as the block zone 77 associated with a nearby user 16 moves. In some embodiments, the distance from the user 16 that each block zone 77 is defined by may be variable in length and/or static. For example, in some embodiments, the block zone 77 may be approximately twenty feet, thirty feet, forty feet, between ten and forty feet, and/or greater than forty feet. In some embodiments the user 16 may be disposed in the center of the block zone 77. In some embodiments, the user 16 may be disposed at a rear or a front of the block zone 77.

Furthermore, in some embodiments, the user 16 may be permitted to travel between adjacent tracks 14. For example, the user 16 may travel through a VR alternate route entry 80 (e.g., portal, door, etc.) which may be associated with a physical track switch 82. Particularly, in some embodiments, if an adjacent route 84 (e.g., an adjacent track 14 and/or path 12) is not currently occupied, the user 16 may be presented with an option to travel to the adjacent route 84 which may present its self as the VR alternate route entry 80. If the user 16 travels to the adjacent route 84, the bogie 20 to which the user 16 is coupled may be routed (e.g., transferred) to the track 14 of the adjacent route 84 via the physical track switch 82. In some embodiments, the physical track switch 82 may function in a manner similar to that of a railroad track switch. However, in some embodiments, the physical track switch 82 may be any mechanical device capable of switching the bogie 20 between adjacent tracks 14 of adjacent routes 84. In some embodiments, the physical track switch 82 may be communicatively coupled to a track switch controller 83 that may send a signal to the physical track switch 82 to activate the physical track switch 82 as described above.

Figure 5:
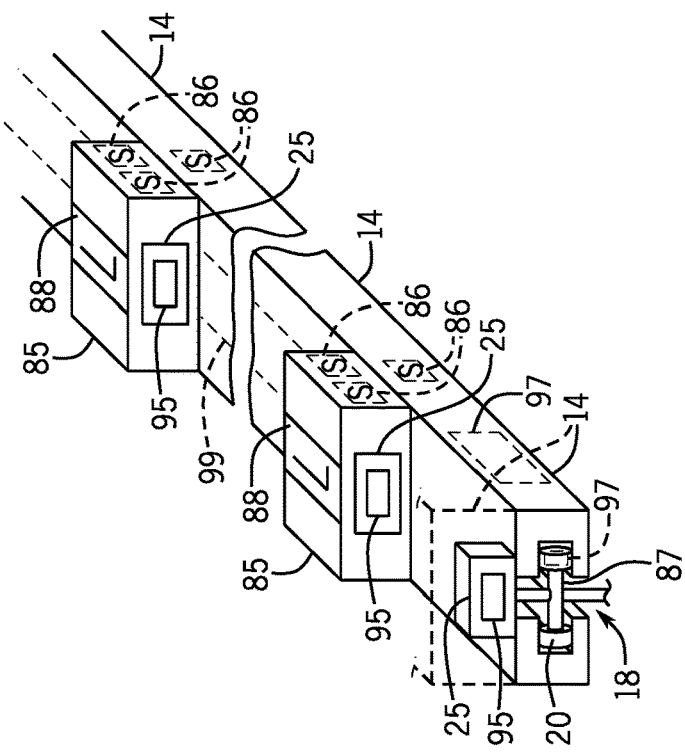
FIG. 5 is a perspective view of an embodiment of a block that may be utilized with the VR track system of FIG. 1 in accordance with present techniques.

At least in part to monitor and implement the block zones 77 as discussed above, the attraction 10 may utilize one or more blocks 85 as seen in FIG. 5. To this end, each block 85 may include one or more sensors 86 (e.g., sensor arrays) and one or more locking mechanisms 88. The one or more sensors 86 may be any suitable proximity sensor that may be capable of sensing the presence of the bogie 20. For example, the one or more sensors may be motion detectors, occupancy sensors, proximity sensors, infrared sensors, optical sensors, triangulation sensors, or any combination thereof. The one or more locking mechanisms 88 may be any suitable locking mechanism that, when activated, prevents the bogie 20 from moving in one or more directions along the track 14. For example, the one or more locking mechanisms 88 may be drop pins, balloons, electromagnets, brakes, or any combination thereof. In some embodiments, the one or more locking mechanisms 88 may be coupled directly to the bogie 20. In the current embodiment, the block 85 is depicted as being disposed above the track 14, however, it is to be understood that the functions and mechanisms of the block 85 may be housed in various suitable locations including within the track 14 and below the track 14.

Overall, the sensors 86 may obtain data regarding the location of the bogie 20, and by extent, the approximate location of the user 16. For example, as the bogie 20 moves along the track 14, the bogie 20 may pass by one or more of the sensors 86. Once the bogie 20 passes a particular sensor 86 of the one or more sensor 86, the particular sensor 86 may send location data to the image controller 25 indicating that the bogie 20 has passed the point along the track 14 in which the particular sensor 86 is located. Accordingly, the image controller 25 may analyze the location data and determine the location of the bogie 20 and the approximate location of the user 16 along the track 14.

Further, in some embodiments, for example, embodiments where block zones 77 are associated with sections along the path 12 and/or track 14, the block 85 may be stationary. In such embodiments, the image controller 25 may determine occupancy of a particular block zone (e.g., block zone 77) from analyzing the location data obtained from the sensors 86. Particularly, one or more of the blocks 85 may be located between each block zone 77. In this manner, the sensors 86 of the block 85 may receive location data indicating that the bogie 20 of the user 16 has passed the location of the block 85, which may indicate when the user 16 enters or leaves the particular block zone 77. Thus, the image controller 25 may receive and use this information to determine which block zone 77 the user 16 is currently located in. Each image controller 25 may communicate this information to an attraction controller 90, which may monitor and track the number of users 16 in each block zone 77 of the VR track system 11. Accordingly, as discussed above, if the block zone 77 is occupied, then additional users 16 may be prevented from entering the occupied block zone 77. While it may appear to the user 16 that they are prevented from entering the occupied block zone 77 due to the obstruction of the VR impassible obstacle 78, they may actually be prevented from entering the occupied block zone 77 due to the block 85 preventing the bogie 20 from moving along the track 14. For example, if the image controller 25 and/or attraction controller 90 determines that a block zone 77 is occupied, the image controller 25 and/or the attraction controller 90 may send a signal to the block 85 to employ the one or more locking mechanisms 88, thereby preventing the bogie 20 from moving past the block 85 and into an occupied block zone 77.

In some embodiments, for example, embodiments where block zones 77 are associated with current locations of the users 16 and/or bogie 20, the block 85 may move along the track 14 in conjunction with the bogie 20 and may be coupled to the bogie 20. In such embodiments, the image controller 25 may also determine the location of the block zone 77 from analyzing the location data obtained from the sensors 86. For example, as the bogie 20 and the block 85 move along the track 14, sensors 86 disposed along the track 14 and/or in the block 85 may receive position information indicating that the bogie 20 and/or block 85 is at a certain location along the track 14. The image controller 25 may receive the position information from the sensors 86 and determine information regarding the location of the bogie 20 and the block zone 77 that is associated with the bogie 20. The image controller 25 may communicate this information to the attraction controller 90, which may monitor and track the location of each bogie 20 and block zone 77 of the VR track system 11. Accordingly, as discussed above, if the user 16 is close to another (occupied) block zone 77, the image controller 25 and/or attraction controller 90 may send a signal to the block 85 to employ the one or more locking mechanisms 88, thereby preventing occupied block zones 77 from overlapping. In some embodiments, the image controller 25 may be disposed within the block 85.

As seen in FIGS. 3-5, the bogie 20 may include a motor 87 which may provide artificial power (e.g., mechanical and/or automated power) to drive the bogie 20. Artificial power may be defined herein as power not produced directly from user input. In other words, artificial power may be produced due to an electrical and/or combustion process. As discussed thoroughly herein, the bogie 20 may move in response to user input. For example, the user 16 may walk along the path 12 (FIG. 1) and pull the bogie 20 along the track 14. However, in some embodiments, the attachment system 18 may include the motor 87 which may provide at least a portion of the power to move the bogie 20 along the track 14. For example, as discussed in further detail below, the motor 87 may move in conjunction with the user 16 such that the user 16 does not provide more power than is natural to move along the path 12 substantially unburdened by the attachment system 18. Further, in some embodiments, the motor 87 may motivate the user 16 to move faster along the path 12. For example, the motor 87 may provide a force through the attachment system 18 to encourage the user 16 to move along the path 12 if the user 16 is taking an excessive amount of time to progress along the path 12.

Also as seen in FIGS. 3-5, the image controller 25 may include a battery 95 which may provide power to the image controller 25. In some embodiments, the battery 95 may be hot swappable. In this manner, if the battery 95 overheats, runs out of charge, or needs replacement for some other reason, the battery 95 may be replaced with a fresh battery 95 while the headgear 30 (FIG. 1) and the VR track system 11 (FIG. 1) continue to operate. Further, in some embodiments, the battery 95 may be charged as the bogie 20 moves along the track 14. Particularly, the battery 95 may be inductively charged by a generator 97 as the bogie 20 moves along the track. To this end, the generator 97 may include conductive coils (e.g., copper wire coils) that are disposed along the track 14 and one or more magnets coupled to the bogie 20. Therefore, as the bogie 20 moves along the track 14, the magnetic field of the magnets may move past the coils, thereby inducing an electric current in the conductive coils. The electric current may be processed (e.g., by a rectifier) and used to power the battery 95. It should also be noted that in some embodiments, the locations of the conductive coils and magnets may be reversed. For example, the magnets may located along the track 14, and the conductive coils may be coupled to the bogie 20. In such embodiments, power may be generated and stored in the battery 95 in a similar manner as discussed above.

In some embodiments, power produced by the generator 97 may be used to power other elements of the VR track system 11. To this end, the track 14 may include a bus bar 99 (e.g., conductive metallic strip) which may help to collect and distribute the power produced in the generator 97. For example, the bus bar 99 may be communicatively coupled to the VR track system 11, the attachment system 18, and the attraction controller 90. Further, in some embodiments, the bus bar 99 may facilitate communication between the attraction controller 90 and the attachment system 18. For example, the bogie 20 may include one or more brushes (e.g., carbon brushes) that may electrically couple the attachment system 18, and more specifically, the image controller 25, to the bus bar 99, thus facilitating the communication between the image controller 25 and the attraction controller 90.

Further, in some embodiments, the image controller 25 may be directly coupled to a top portion of the bogie 20 and move with the bogie 20. In such embodiments, the track 14 may be appropriately sized (e.g., with increased height) to accommodate structures of the bogie 20 and the image controller 25. Additionally, or in the alternative, the track 14 may include an open-top design to accommodate the image controller 25. In embodiments including the open-top design, elements such as the bus bar 99 and the block 85 may be disposed on a side of the track 14 or any other appropriate location in which they may still sufficiently serve their purpose as described herein.

Figure 6:
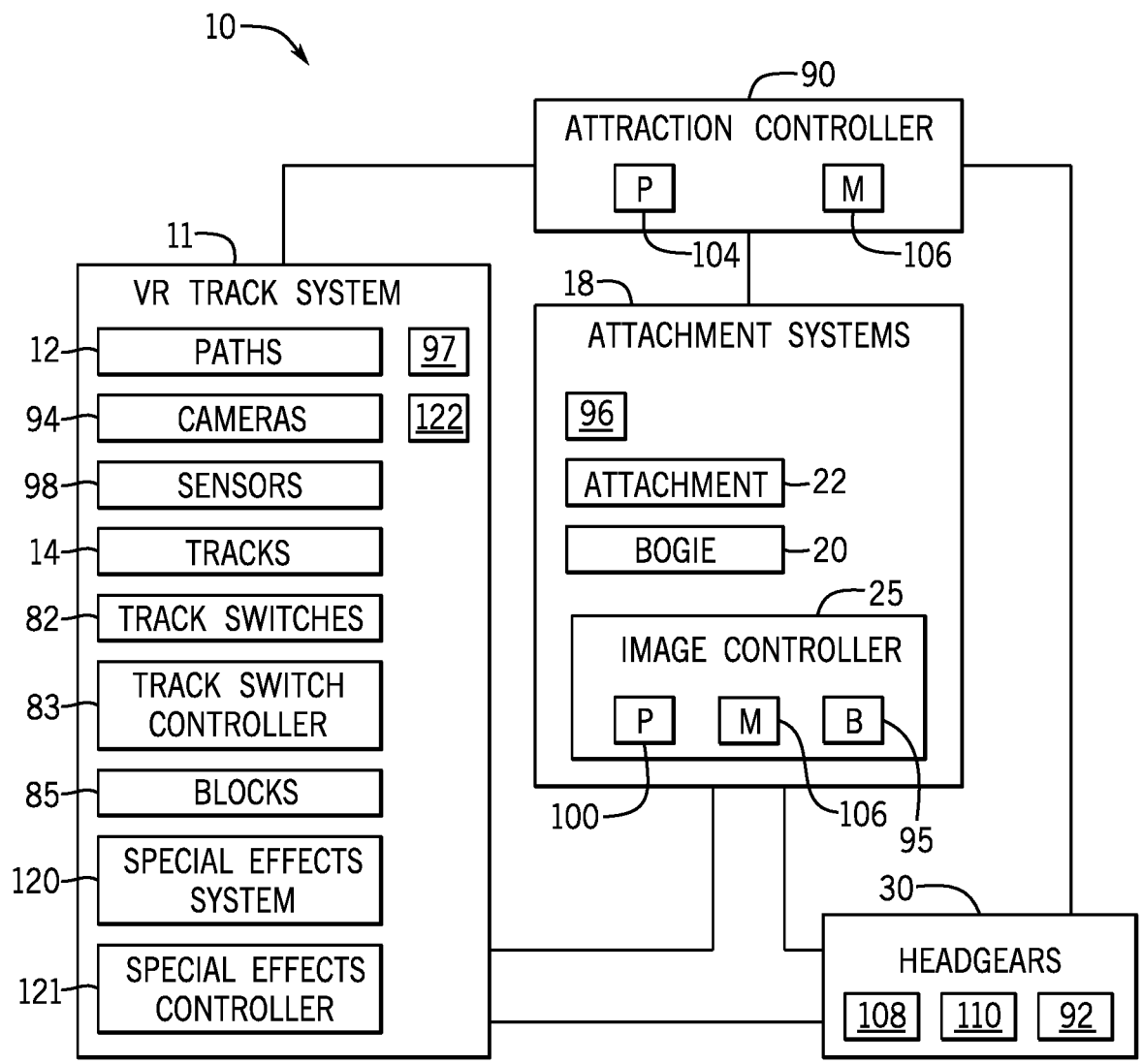
FIG. 6 is a block diagram of an embodiment of the attraction of FIG. 1 in accordance with the present techniques.

Keeping this in mind, FIG. 6 is a block diagram of the attraction 10. Each user 16 may be provided with the attachment system 18 (e.g., bogie system) that may be separate from or coupled to the headgear 30. In some embodiments, the headgear 30 may be included as part of a helmet, a visor, a headband, a pair of blinders, one or more eyepatches, and/or other headwear or eyewear that may be worn by the user 16. As depicted, the headgear 30 may be communicatively coupled to the image controller 25 of the attachment system 18, which is communicatively coupled to the attraction controller 90 and the path 12 via a wireless network (e.g., wireless local area networks [WLAN], wireless wide area networks [WWAN], near field communication [NFC]). The image controller 25, headgear 30, and attraction controller 90 may be used to create the VR scenario 40, which may include an AR experience, a VR experience, a mixed reality (e.g., a combination of AR and VR) experience, a computer-mediated reality experience, a combination thereof, or other similar surreal environment for the user 16 as the user 16 enjoys the attraction 10. Specifically, the headgear 30 may be worn by the user 16 as the user 16 progresses through the VR track system 11 such that the user 16 may feel completely encompassed by the VR scenario 40 and may perceive the VR scenario 40 to be a real-world physical environment. Specifically, as will be further appreciated, the VR scenario 40 may be a real-time video including real-world images of the path 12 that the user 16 would see, even when not wearing the headgear 30, electronically merged with one or more AR or VR images (e.g., virtual augmentations). The term "real-time" indicates that the images are obtained and/or provided in a timeframe substantially close to the time of actual observation.

In certain embodiments, the headgear 30 may be any of various wearable electronic devices that may be useful in creating an AR experience, a VR experience, and/or other computer-mediated experience to enhance the thrill factor of the attraction 10, and, by extension, the experience of the user 16 while in the attraction 10. It should be appreciated that the headgear 30 as discussed herein may be distinct from, and may provide many advantages over traditional devices such as traditional head-mounted displays (HMDs) and/or heads-up displays (HUDs). For example, as will be further appreciated, the headgear 30 may include a number of orientation and position sensors 92, e.g., accelerometers, magnetometers, gyroscopes, Global Positioning System (GPS) receivers, that may be used to track the position, orientation, and motion of the user 16 during a cycle of the attraction 10.

In some embodiments, the headgear 30 (e.g., indicators disposed thereon) may be monitored by a monitoring system (e.g., one or more position sensors 94, such as a camera) to determine position, location, orientation, and so forth of the headgear 30 and/or that of the user 16. Alternatively or additionally, the attachment system 18 may also include one or more sensors 96 (e.g., weight sensors, mass sensors, motion sensors, ultrasonic sensors, position sensors) that may be useful in monitoring the respective user 16 for the VR track system 11 to determine the point of view and/or location of the respective user 16 and/or headgear 30. Similarly, the path 12 and/or track 14 may also include one or more sensors 98 (e.g., weight sensors, mass sensors, motion sensors, ultrasonic sensors, cameras, position sensors, orientation sensors) that may be useful in monitoring the respective user 16 for the VR track system 11 to determine the point of view and/or location of the respective user 16. In some embodiments, the VR track system 11, and more specifically, the image and/or attraction controllers 25, 90, may utilize the point of view of the headgear 30, the location of the user 16, a speed and direction of the user 16, or any combination thereof to determine a predicted movement of the user 16. For example, if the user 16 is looking or facing in a particular direction, the image and/or attraction controller 25, 90 may determine that the user will likely move in the particular direction (e.g., the predicted movement). The image and/or attraction controllers 25, 90 may utilize the predicted movement information of the user 16 and send a signal to the motor 87 to motivate the bogie 20 in the direction of the predicted movement. In this manner, the movement of the bogie 20 may be anticipatory of the user's 16 movement such that the bogie 20 moves in conjunction with the user 16 and the user 16 does not simply drag the bogie 20 along the track 14.

In certain embodiments, to support the creation of the VR scenario 40, the image controller 25 may include processing circuitry, such as a processor 100 and a memory 102. Similarly, the attraction controller 90 may include processing circuitry, such as a processor 104 and a memory 106. The processors 100, 104 may be operatively coupled to the memories 102, 106, respectively, to execute instructions for carrying out the presently disclosed techniques of generating the VR scenario 40 to enhance the thrill factor of the attraction 10, and, by extension, the experience of the user 16 while in the attraction 10. These instructions may be encoded in programs or code stored in a tangible non-transitory computer-readable medium, such as the memories 102, 106 and/or other storage. The processors 100, 104 may be general-purpose processors, system-on-chip (SoC) devices, application-specific integrated circuits (ASICs), or some other similar processor configuration.

In certain embodiments, as further illustrated, the headgear 30 may also include a display 108, which may include one or more display screens respectively corresponding to each eye of the user 16. In other embodiments, the display 108 may include a single display screen for both eyes of the user 16. The display 108 may include an opaque liquid crystal display (LCD), an opaque organic light emitting diode (OLED) display, or other similar display useful in displaying real-time images of the path 12 and the VR scenario 40 to the user 16. In another embodiment, the display 108 includes a see-through LCD or a see-through OLED display useful in allowing, for example, the user 16 to view the real-time images of the path 12 and the VR scenario 40 appearing on the display 108 while preserving the ability to see through the display 108 to the actual and physical real world environment (e.g., the path 12).

Camera(s) 110 of the headgear 30 may respectively correspond to the respective points of view of the user 16, and may be used to capture real-time video data (e.g., live video) of the path 12. Specifically, in the illustrated embodiment, the camera(s) 110 of the headgear 30 may be used to capture real-time images of the real-world physical path 12 perceived by the respective user 16 from the point of view of the respective user 16. As will be further appreciated, the headgear 30 may then transmit (e.g. wirelessly via one or more communications interfaces included in the headgear 30) real-time video data captured via the camera(s) 110 to the image controller 25 and/or the attraction controller 90 for processing (e.g., via a graphics processing unit (GPU) of the image and/or attraction controllers 25, 90). Additionally, the headgear 30 may also transmit orientation data, position data, point of view data (e.g., focal length, orientation, pose, and so forth), motion tracking data, and so forth obtained and/or derived based on data obtained via orientation and position sensors 94, 96, 98, 92 (e.g., accelerometers, magnetometers, gyroscopes, Global Positioning System [GPS] receivers, motion-capture cameras and so forth) motion tracking sensors (e.g., electromagnetic and solid-state motion tracking sensors), etc., that may be included in the headgear 30, the attachment system 18, and the path 12.

In certain embodiments, as previously noted, the image and/or attraction controllers 25, 90 may process the real-time video data (e.g., live video) and orientation and position data and/or point of view data received from the attachment system 18. Specifically, the image and/or attraction controllers 25, 90 may use this data to generate a frame of reference to register the real-time video data with the generated VR scenario 40. Specifically, using the frame of reference generated based on the orientation data, position data, point of view data, motion tracking data, and so forth, the image and/or attraction controllers 25, 90 may then render a view of the VR scenario 40 that is temporally and spatially commensurate with what the respective user 16 would perceive if not wearing the headgear 30. The image and/or attraction controllers 25, 90 may constantly update (e.g., in real-time) the rendering of the real-world images to reflect change in respective orientation, position, and/or motion of the respective user 16.

For example, in certain embodiments, the image and/or attraction controllers 25, 90 may render images (e.g., VR scenario 40) at a real-time rate greater than or equal to approximately 20 frames per second (FPS), greater than or equal to approximately 30 FPS, greater than or equal to approximately 40 FPS, greater than or equal to approximately 50 FPS, greater than or equal to approximately 60 FPS, greater than or equal to approximately 90 FPS, or greater than or equal to approximately 120 FPS. Furthermore, the image and/or attraction controllers 25, 90 may generate the real-world images of the path 12 for each of the respective headgear 30 worn by the respective user 16 (e.g., adjusted for the respective orientation, position, and point of view of the respective user 16).

In certain embodiments, as previously discussed, the image and/or attraction controllers 25, 90 may also generate and render one or more VR graphical images of the VR scenario 40 superimposed on the real-world images of the path 12 to create a complete AR experience, VR experience, mixed reality, and/or other computer-mediated experience for the user 16. For example, in certain embodiments, the image and/or attraction controllers 25, 90 may utilize one or more of the discussed video merging and/or optical merging techniques to superimpose the VR graphical images of the VR scenario 40 onto the real-world images of the path 12, such that the user 16 perceives the real-world physical path 12 of the attraction 10 (e.g., provided as rendered video data via the display 108) along with a VR graphical image of the VR scenario 40 (e.g., virtual augmentations) as the users 16 traverse the VR track system 11. Specifically, as discussed above with respect to the rendering of the real-world images, the image and/or attraction controllers 25, 90 may render a view of the VR/AR graphical images of the VR scenario 40 that is temporally and spatially commensurate with the real-world images of the path 12, such that the real-world images of the path 12 may appear as a background overlaid with the VR/AR graphical images of the VR scenario 40. Indeed, a model may provide computer-generated images for any available viewpoint and specific images may be provided to the headgear 30 for display based on a detected orientation of the headgear 30.

In certain embodiments, the image and/or attraction controllers 25, 90 may also generate one or more brightness, lighting, or shading models, and/or other photorealistic rendering models to generate the real-world images of the path 12 and the VR graphical images of the VR scenario 40 adjusted to accurately reflect contrast and brightness of the real-world physical path 12 (e.g., sunny day, partly cloudy day, cloudy day, evening, night) in rendering the real-world images of the path 12 and the VR graphical images of the VR scenario 40. For example, to increase the photorealism of the real-world images of the environment and the VR graphical images of the VR scenario 40, the image and/or attraction controllers 25, 90 may, in some embodiments, receive weather related data from one or more weather forecast and/or prediction systems (e.g., Global Forecast System, Doppler radars, and so forth). The image and/or attraction controllers 25, 90 may then use the weather related data or other similar data to adjust the contrast, brightness, and/or other lighting effects of the real-world images of the environment and/or the VR graphical images of the VR scenario 40.

In other embodiments, the image and/or attraction controllers 25, 90 may adjust the contrast, brightness, and/or other lighting effects of the real-world images of the path 12 and/or the VR graphical images of the VR scenario 40 based on lighting detected from one or more light sensors included in the headgear 30 and/or attachment system 18 or based on the real-time video data captured by the camera(s) 110. Furthermore, as previously noted, the image and/or attraction controllers 25, 90 may constantly update (e.g., in real-time) the rendering of the VR graphical images of the VR scenario 40 to reflect change in respective orientations, positions, points of view, and/or motion of the respective user 16. For example, the image and/or attraction controllers 25, 90 may render the VR graphical images of the VR scenario 40 on the display(s) 108 of each of the respective headgears 30 worn by the respective user 16 adjusted for the variable respective positions, points of view, and motions of the respective user 16.

As will be further appreciated, the image and/or attraction controllers 25, 90 may also generate the VR graphical images of the VR scenario 40 at a time in which the user 16 crosses a predetermined point within the path 12. Thus, in certain embodiments, the image and/or attraction controllers 25, 90 may use the received position data, point of view data, motion data along with GPS data, or geographical informational systems (GIS) data to derive an illumination map of, for example, the attraction 10. The image and/or attraction controllers 25, 90 may then use the map to introduce certain VR graphical images of the VR scenario 40 at certain predetermined points (e.g., points based on location, distance, or time) as the user 16 traverses the path 12. Furthermore, in certain embodiments, the video or image data captured via the camera(s) 110 may be used by the image and/or attraction controllers 25, 90 to determine the points of location of the user 16 and when to introduce certain VR graphical images of the VR scenario 40. For example, a GPU of the image controller 25 and the attraction controller 90 may perform one or more geometric recognition algorithms (e.g., shape or object recognition) or photometric recognition algorithms (e.g., face recognition or specific object recognition) to determine the position or location of the user 16 as well as the viewing position of the user 16. In some embodiments, the image controller 25 and/or attraction controller 90 may communicate wirelessly with the headgear 30. Further, in some embodiments, the image controller 25 may be integrally coupled with the headgear 30. In some embodiments, images (e.g., VR images) supplied to the headgear 30 from the image controller 25 and/or the attraction controller 90 may be based on VR image data supplied from the image controller 25 and/or the attraction controller 90 to the headgear 30. In addition, it should also be noted that, while embodiments discussed above may utilize a separate image controller 25 and/or an attraction controller 90, some embodiments may utilize a single controller configured to perform the actions of the image controller 25 and attraction controller 90 as described herein.

In some embodiments, the single controller may be disposed on the attachment system 18, the track 14 or elsewhere within the attraction 10.

Further, as seen in FIG. 6, the VR track system 11 may include one or more paths 12, one or more tracks 14 having the generator 97, one or more physical track switches 82, and one or more blocks 85, which may also function as described in detail above. Further still, the VR track system 11 may include a special effects system 120. The special effects system 120 may be coupled to the path 12, track 14, attachment system 18, harness 24, or any combination thereof and may supply various special effects that may serve to further immerse the user 16 within the narrative of the attraction 10. For example, the special effects system 120 may include a sound system, a vibration system, a bass system, a fluid system, a smoke/vapor system, or any combination thereof. In some embodiments, the special effects system 120 may be communicatively coupled to a special effects controller 121. The special effects controller 121 may send a signal to the special effects system 120 to activate the special effects system 120. In some embodiments, activation of the special effects system 120 may be based on a location, the point of view of the user 16, interactions between the VR track system 11 and the user 16, or any combination thereof. Also, as mentioned above, the special effects system 120 may be coupled to each attachment system 18. In this manner, special effects (e.g., mist, sound, smoke/vapor, rain, etc.) may be administered from a location adjacent to the user 16 (e.g., above the user 16). Having individualized special effect systems 120 on each attachment system 18 as described above may reduce costs relative to embodiments with the special effects system 120 located throughout the VR track system 11. Further, in some embodiments, some portions of the special effects system 120 may be coupled to the attachment system 18 while portions of the special effects system 120 may be placed throughout the VR track system 11. The special effects controller 121 may also be located on each attachment system 18 and/or at a single location similar to the attraction controller 90.

Furthermore, the VR track system 11, and more specifically, the image and/or attraction controllers 25, 90, may be communicatively coupled to a haptic feedback system 122. The haptic feedback system 122 may also serve to further immerse the user 16 within a narrative of the VR scenario 40. In some embodiments, the haptic feedback system 122 may include one or more wearable items that the user 16 may don (e.g., gloves, suit, sleeves, etc.). Overall, the haptic feedback system 122 may interact with the user 16 such that the user 16 thinks they are physically feeling elements of the VR scenario 40. To this end, the haptic feedback system 122 may provide a variety of stimuli to the user 16 including but not limited to, various pressures, various temperatures, vibrations, etc. For example, while the user 16 may think they are actually gripping an item from the VR scenario 40, they may actually just see the item through the headgear 30 and feel a pressure response from the haptic feedback system 122.

Figure 7:
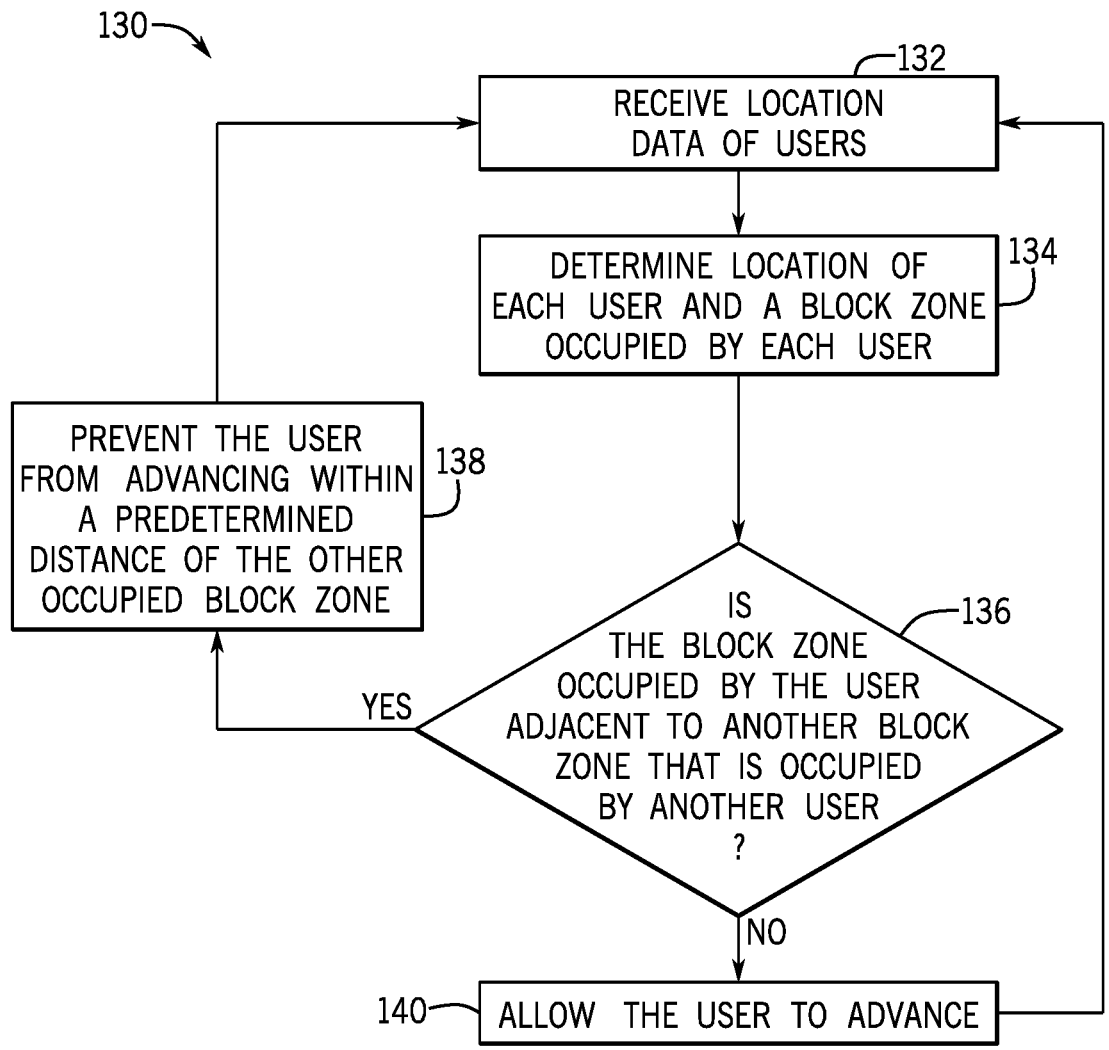
FIG. 7 is a flow chart of an embodiment of a method for enforcing block zones of the VR track system of FIG. 1 in accordance with the present techniques.

FIG. 7 is a flow chart of a block zone method 130 of the VR track system 11. At block 132, a controller (e.g., image controller 25 and/or attraction controller 90) may receive location data of the users 16 within the VR track system 11. The location data may be gathered from one or more sensors (e.g., sensors 86, 92, 94, 96, 98) of the attraction 10. At block 134, the controller (e.g., image controller 25 and/or attraction controller 90) analyze the location data and determine a location of each user and the block zone occupied by each user 16. As discussed above, in some embodiments the user 16 may be associated with a block zone 77 that moves in conjunction with the user 77. Further, in some embodiments, the user 16 may travel between stationary block zones 77. At decision block 136, the controller (e.g., image controller 25 and/or attraction controller 90) may determine whether a particular block zone 77 that is occupied by a particular user 16 is adjacent to another block zone 77 that is occupied by another user 16.

If the controller (e.g., image controller 25 and/or attraction controller 90) determines that the particular occupied block zone 77 is adjacent to the other occupied block zone 77, the controller (e.g., image controller 25 and/or attraction controller 90) may prevent the particular user 16 from moving within a predetermined distance of the other occupied block zone 77 (block 138). For example, in some embodiments, the predetermined distance may be based on a length of the particular occupied block zone 77 and/or a length of the other occupied block zone 77. If the controller (e.g., image controller 25 and/or attraction controller 90) determines that the particular occupied block zone 77 is adjacent to the other occupied block zone 77, the controller (e.g., image controller 25 and/or attraction controller 90) may allow the user 16 to advance closer to the other occupied block zone 77. In some embodiments, advancement or prevention of user movement may be implemented by one or more locking mechanisms (e.g., locking mechanism 88) as discussed above.

Further, it should be noted that functions of the controllers (e.g., image controller 25, track switch controller 83, special effects controller 121, and attraction controller 90) may be controlled through or implemented by a single controller. In some embodiments, that single controller may be the attraction controller 90.

While only certain features of present embodiments have been illustrated and described herein, many modifications and changes will occur to those skilled in the art. It is, therefore, to be understood that the appended claims are intended to cover all such modifications and changes that fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A ride attraction system, comprising:
   a track;
   a bogie coupled to the track and configured to move along the track;
   an attachment coupled to the bogie and configured to couple a user to the bogie, wherein the attachment is configured to allow the user to move at an angle relative to the track; and
   an image controller coupled to the bogie, wherein the image controller is configured to supply virtual reality (VR) and/or mixed reality (MR) images to the user via headgear.

2. The ride attraction system of claim 1, further comprising:

a second track;

a second bogie coupled to the second track and configured to move along the second track;

a second attachment coupled to the second bogie and configured to couple a second user to the second bogie; and one or more track switches configured to transfer the bogie and the second bogie between the track and the second track.

3. The ride attraction system of claim 1, wherein the bogie is configured such that movement of the bogie along the track is powered by a motor and/or movement of the user.

4. The ride attraction system of claim 1, wherein the bogie and the attachment are configured to at least partially support a weight of the user.

5. The ride attraction system of claim 1, wherein the image controller comprises a battery configured to supply power to the image controller.

6. The ride attraction system of claim 5, further comprising a generator configured to provide power to the battery via movement of the bogie along the track.

7. The ride attraction system of claim 1, wherein the attachment is coupled to the user via a harness, and wherein the harness is configured to be coupled to the user prior to coupling to the attachment.

8. The ride attraction system of claim 1, wherein the attachment comprises two or more rigid arms coupled together via one or more rotational joints.

9. The ride attraction system of claim 1, wherein the image controller is coupled to the attachment between the user and the bogie.

10. The ride attraction system of claim 1, wherein the attachment comprises a flexible rope or cable extending between the bogie and a harness configured to couple to the user.

11. The ride attraction system of claim 1, further comprising the headgear.

12. A ride attraction system, comprising:

a track;

a plurality of bogies coupled to the track and configured to move along the track under artificial power and/or user power, wherein each of the plurality of bogies is configured to be coupled to a respective user;

at least one locking mechanism coupled to an individual bogie of the plurality of bogies; and a controller configured to:

receive location information related to a location of each of the plurality of bogies along the track;

provide first instructions to the at least one locking mechanism coupled to the individual bogie of the plurality of bogies to cause the at least one locking mechanism to activate based on the location information, wherein the instructions activate the at least one locking mechanism to prevent advancement of the individual bogie along the track;

receive updated location information related to a second location of each of the plurality of bogies along the track; and provide second instructions to the at least one locking mechanism coupled to the individual bogie to cause the locking mechanism to release the individual bogie based on the updated location information.

13. The ride attraction system of claim 12, further comprising one or more sensors disposed along the track and/or the individual bogie and configured to transmit the location information and the updated location information to the controller.

14. The ride attraction system of claim 12, further comprising headgear configured to display virtual reality (VR) images to the respective user via the headgear, wherein the VR images are based on VR image data supplied to the headgear from the controller.

15. The ride attraction system of claim 14, wherein the VR image data supplied to the headgear is based on the location information and/or the updated location information received by the controller, the instructions to activate the locking mechanism, actions of the respective user, or any combination thereof.

16. The ride attraction system of claim 12, further comprising a special effects system configured to provide one or more special effects to the respective user based on the location information and/or the updated location information received by the controller, the instructions to activate the locking mechanism, actions of the respective user, or any combination thereof.

17. The ride attraction system of claim 12, wherein the at least one locking mechanism is a pin, a magnet, a balloon, or any combination thereof.

18. A ride attraction system, comprising:

a track;

a bogie coupled to the track and configured to move along the track under supplied power and/or user power;

at least one locking mechanism coupled to the bogie; and an attraction controller configured to:

receive location information related to a block zone location of the bogie;

provide instructions to the at least one locking mechanism to cause the at least one locking mechanism to activate based on the location information to cause the bogie to remain in the block zone location;

receive input related to one or more actions of a user in the block zone location; and provide instructions to one or both of a track switch controller or a special effects controller based on the input.

19. The ride attraction system of claim 18, further comprising:

a second bogie, wherein the attraction controller is configured to:

receive second location information related to a second block zone location of the second bogie; and provide the instructions to the at least one locking mechanism coupled to the bogie to cause the locking mechanism to activate based on a distance between the block zone location of the bogie and the second block zone location of the second bogie.

20. The ride attraction system of claim 18, further comprising:

a track switch; and a second track, wherein the track switch controller is configured to activate the track switch based on the instructions to the track switch controller, and wherein activating the track switch uncouples the bogie from the track and couples the bogie to the second track.

21. The ride attraction system of claim 18, further comprising a special effects system, wherein the special effects controller is configured to activate the special effects system based on the instructions provided to the special effects controller, and wherein activating the special effects controller activates a vibration effect, a sound effect, a fluid effect, a vapor/smoke effect, or any combination thereof.

* * * * *